June 12, 1923.

1,458,653

O. C. L. HIRSCH
SAUSAGE LINKING AND HANGING MACHINE
Filed Dec. 9, 1920

Otto O. C. L. HIRSCH, INVENTOR

BY
Gabel + Mueller
ATTORNEYS

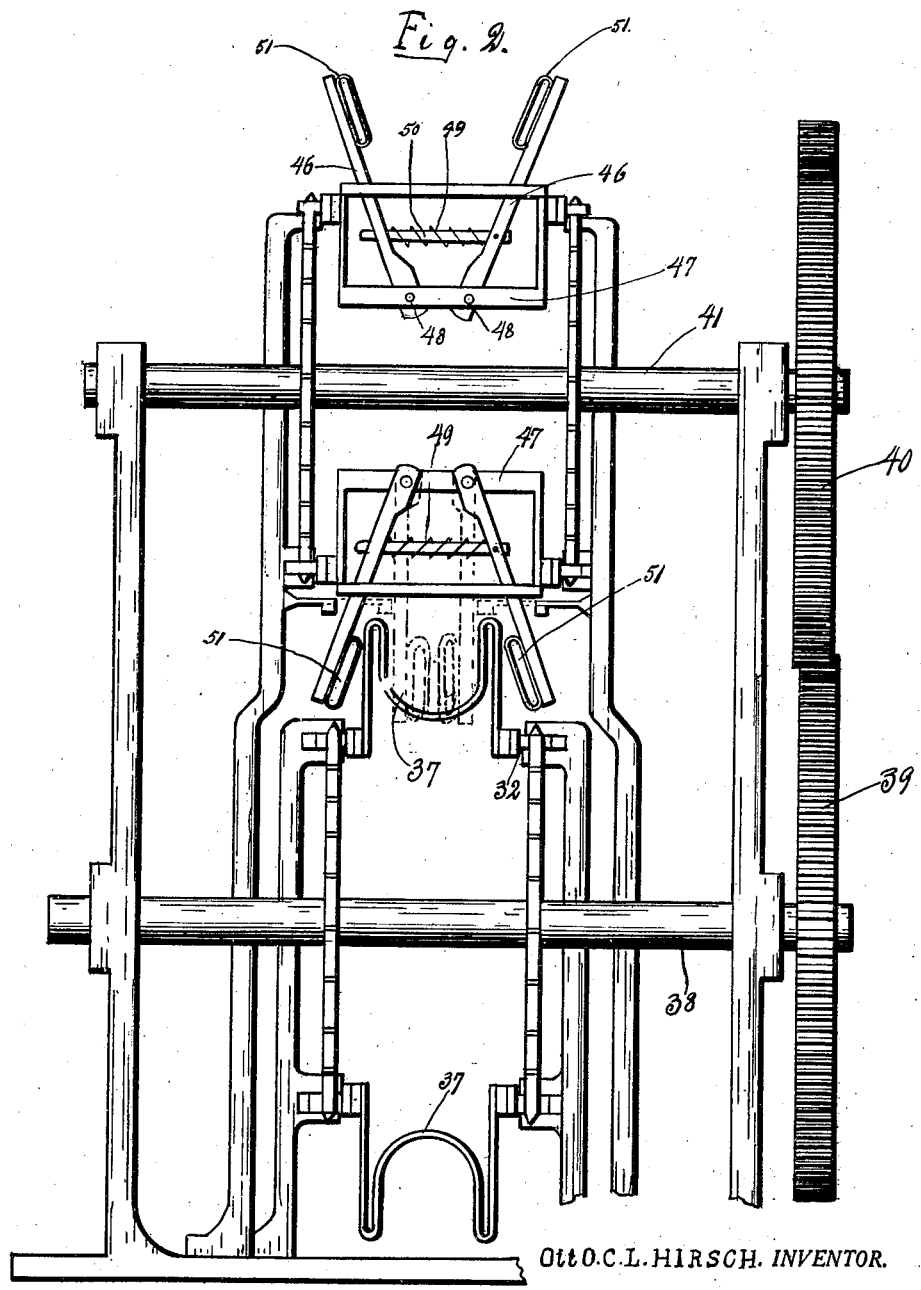

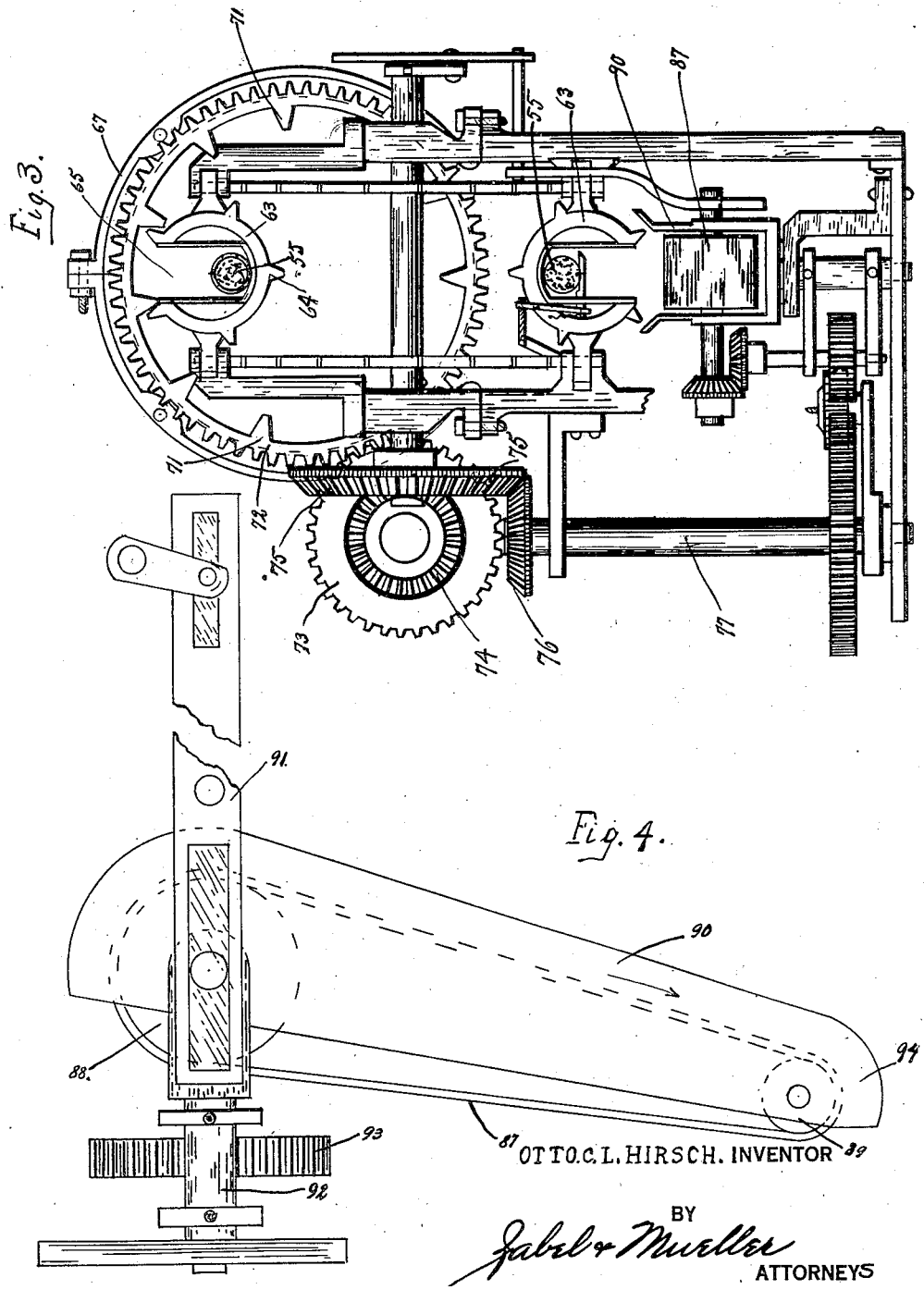

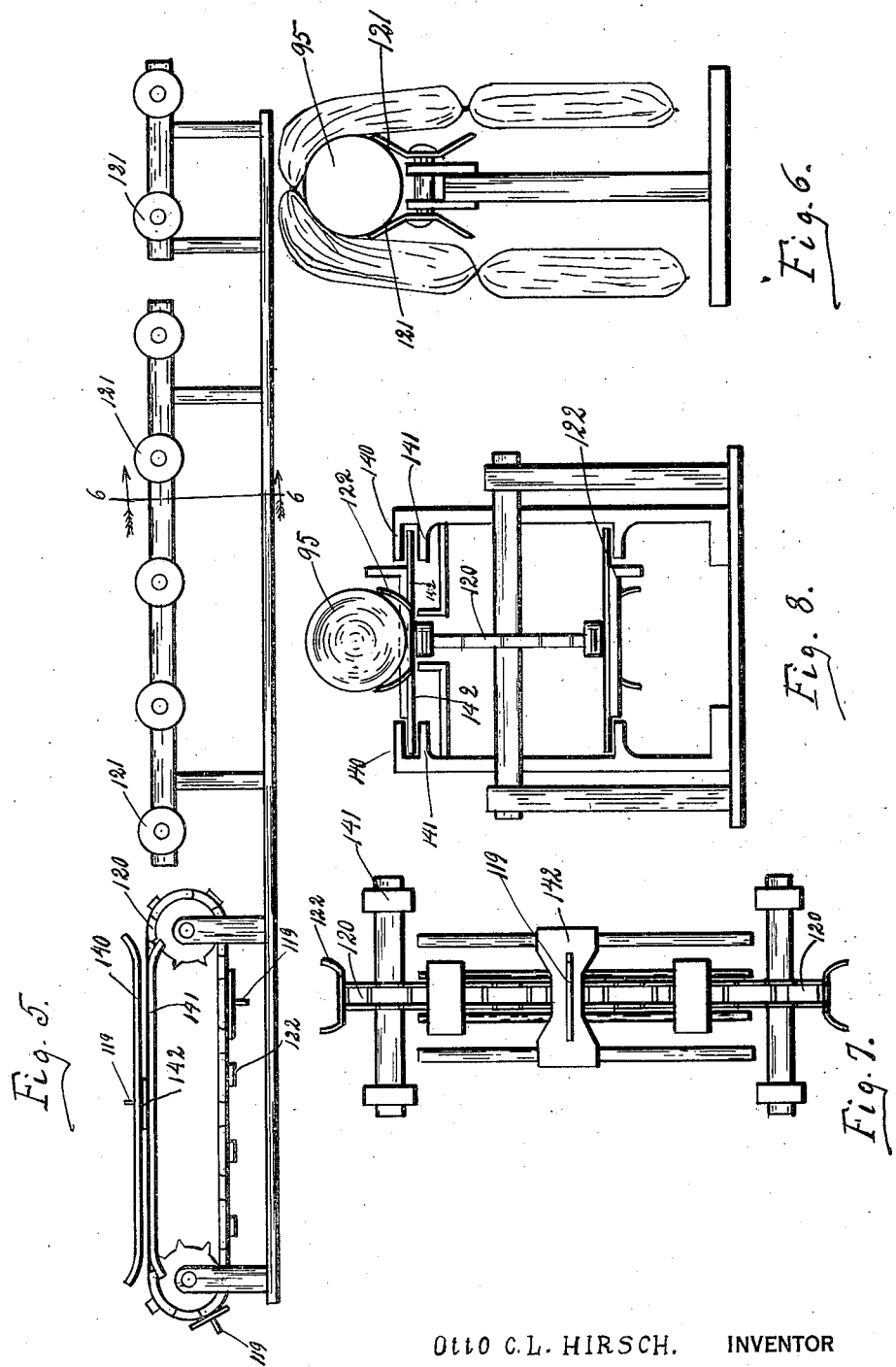

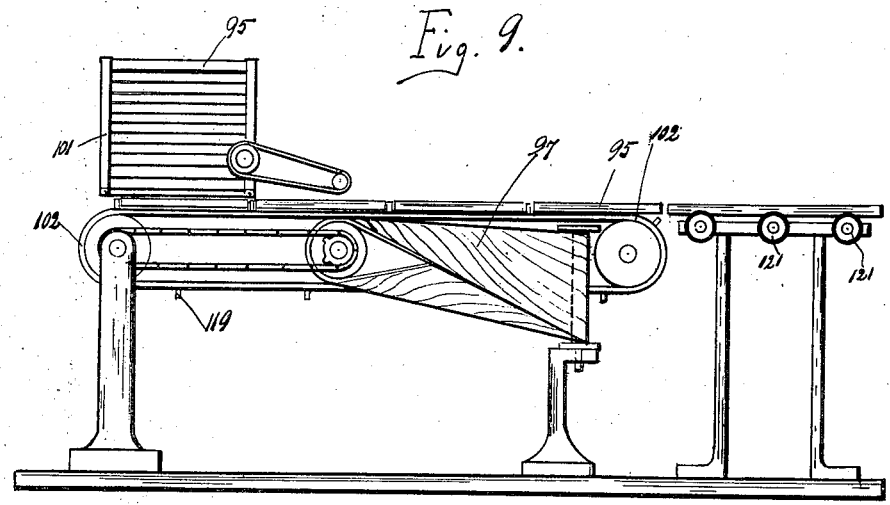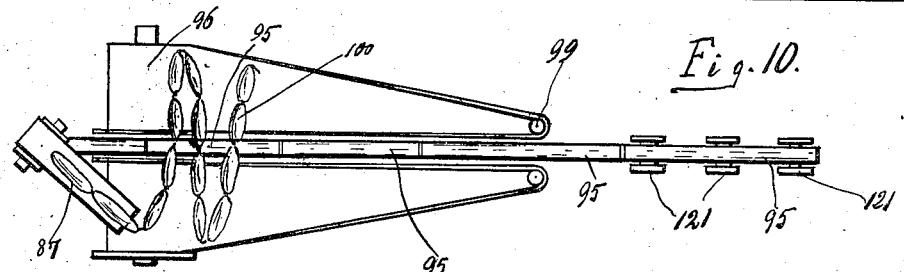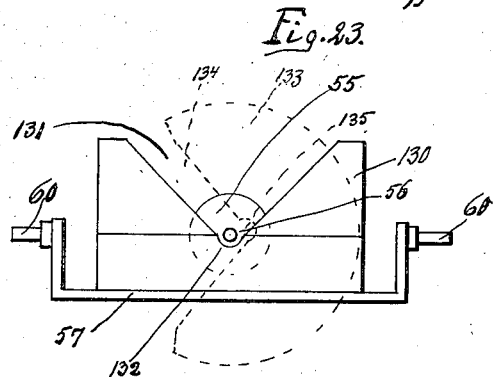

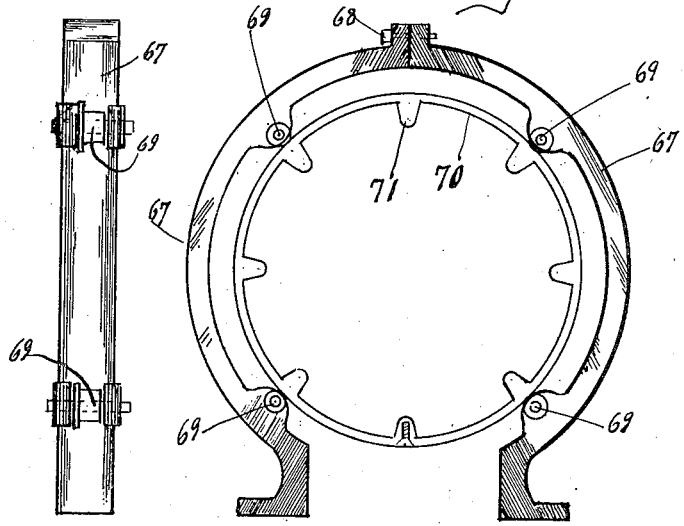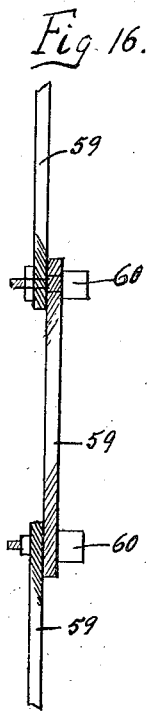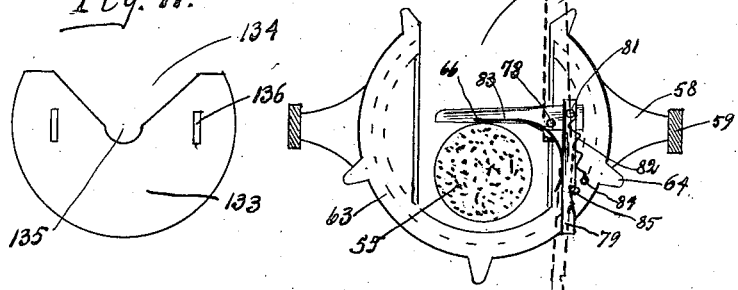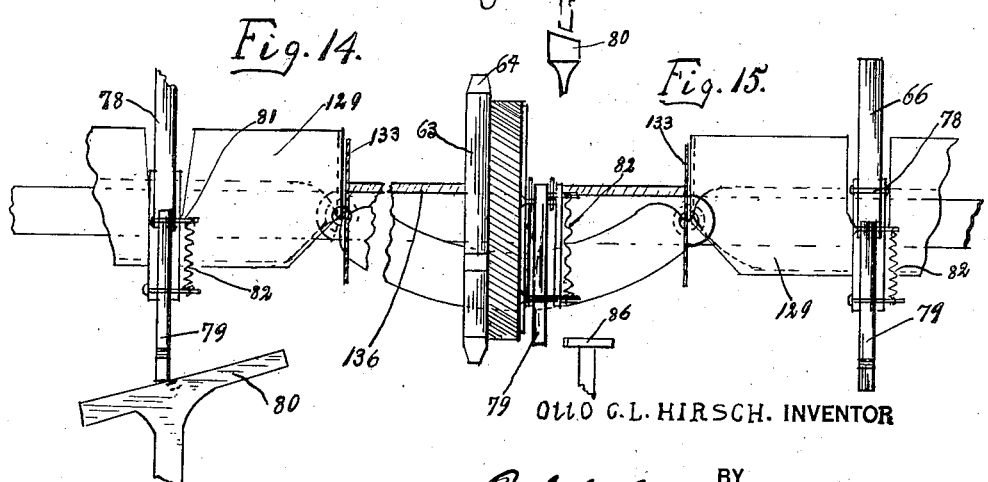

June 12, 1923.
O. C. L. HIRSCH
SAUSAGE LINKING AND HANGING MACHINE
Filed Dec. 9, 1920
1,458,653
7 Sheets-Sheet 7
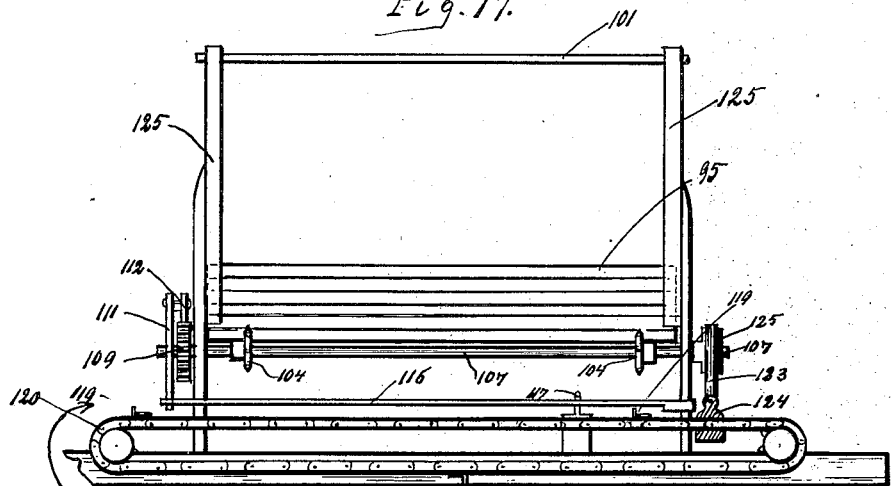
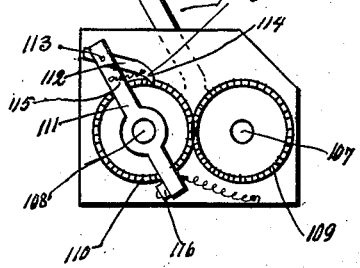
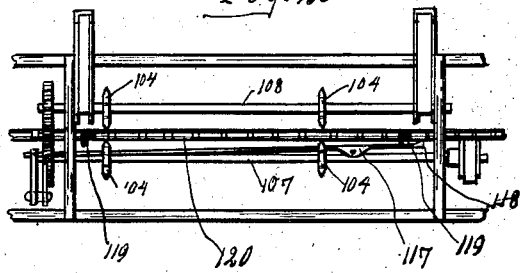
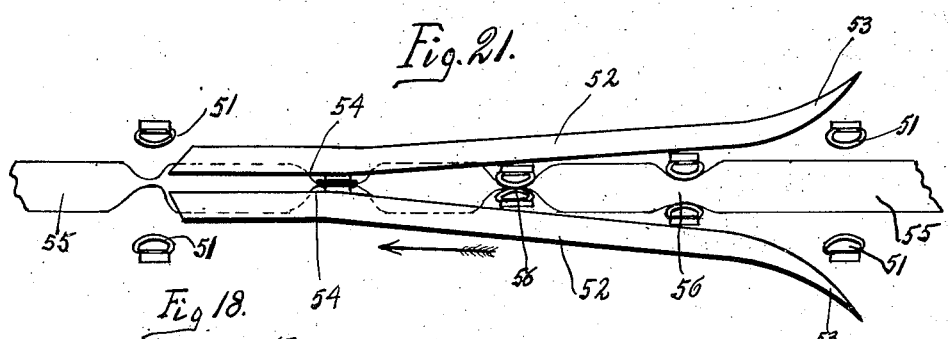
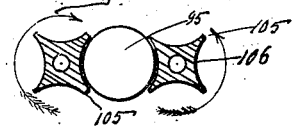
OttO C. L. HIRSCH. INVENTOR
BY
*Gabel & Mueller*
ATTORNEYS Patented June 12, 1923.                                    1,458,653

UNITED STATES PATENT OFFICE.

OTTO C. L. HIRSCH, OF CHICAGO, ILLINOIS, ASSIGNOR TO SAUSAGE LINKING MACHINE CORPORATION, OF CHICAGO, ILLINOIS, A CORPORATION OF ILLINOIS.

SAUSAGE LINKING AND HANGING MACHINE.

Application filed December 9, 1920. Serial No. 429,501.

*To all whom it may concern:*

Be it known that I, OTTO C. L. HIRSCH, a subject of Germany, residing at Chicago, in the county of Cook and State of Illinois, have invented a new and useful Improvement in Sausage Linking and Hanging Machines, of which the following is a full, clear, concise, and exact description, reference being had to the accompanying drawings, forming a part of this specification.

This invention relates to sausage linking and hanging machines and more particularly to a machine for receiving filled casings from a filling machine, separating the meat in the casing into sections as desired, twisting one section relatively to the others and hanging the sausages thus formed across a stock or rod for smoking the same.

It is a purpose of the invention to provide a machine of the above character wherein the means for separating the meat in the casing comprises pairs of flexible members that gradually approach each other to separate the meat in the casing without any possibility of injuring the casing.

It is another purpose of the invention to provide a linking mechanism for receiving the casing with its separated meat sections from the feeding mechanism, and twisting one of said sections relatively to the two adjacent sections which are held against turning, said casing with the separated sections being loosely held in the twisting mechanism so that the section that is being twisted is being rotated around in the arc of a circle, so as to simulate the hand twisting operation as ordinarily performed.

It is a still further object of the invention to provide a meat separating or squeezing mechanism and a linking mechanism through which the casing is carried on conveyors comprising linked sections, wherein the sections of the conveyor associated with the squeezing mechanism are longer than the sections of the conveyor associated with the linking mechanism whereby the casing is carried in the linking mechanism conveyor in a hanging or slack condition, thus allowing for the decrease in length thereof when twisting takes place, and preventing tearing of the same.

It is another purpose of the invention to provide new and improved means for feeding the sausage carrying sticks to a machine of this character.

Other objects and advantages of the invention will appear as the description of the accompanying drawings, showing certain forms that my invention may take, proceeds. However, I desire to have it distinctly understood that I do not intend to limit myself to the exact details of structure shown therein or described in the specification but intend to include as part of my invention, all such obvious changes and modifications of structure as would occur to a person skilled in this art and as would fall within the scope of the claims.

In the drawings:—

Fig. 2 is an end elevation of the squeezing or meat separating mechanism showing the relation of the twisting mechanism thereto, looking from the left of Fig. 1;

Fig. 3 is a section taken on the line 3—3 of Fig. 1;

Fig. 4 is a detail view of the swinging conveyor associated with the hanging mechanism;

Fig. 5 is a view in side elevation of one type of means for carrying the smoking or sausage hanging sticks;

Fig. 6 is a section taken on the line 6—6 of Fig. 5 showing sausages in place on one of the sticks;

Fig. 7 is a plan view of the chain conveyor for the sticks shown at the left of Fig. 5;

Fig. 8 is an end elevation of the structure shown in Fig. 7;

Fig. 9 is a side elevation of the hanging apparatus;

Fig. 10 is a plan view thereof;

Fig. 11 is an end view of the twisting carriage;

Fig. 12 is a transverse sectional view of the twisting mechanism;

Fig. 13 is an end view of the sausage holding carrier with the end plate removed;

Fig. 14 is a side elevation of a carrier showing the same in engagement with the closing cam;

Fig. 15 is a similar view showing the carrier being opened up;

Fig. 16 is a fragmentary plan view of the chain connecting the carriages;

Fig. 17 is a side elevation of the stick holder and associated feeding mechanism;

Fig. 18 is a detail section showing the star wheels for feeding the sticks to the stick conveyor;

Fig. 19 is an elevation of the actuating mechanism for the stick feeding means;

Fig. 20 is a fragmentary detail plan view of the lower part of the stick holder showing the feeding means;

Fig. 21 is a detail plan view of the guides for the squeezing sausage separating fingers;

Fig. 22 is an inside elevation of one of the halves of the twisting carrier;

Fig. 23 is an end view of one of the supporting carriers alternating with the twisting carriers.

Figure 1:
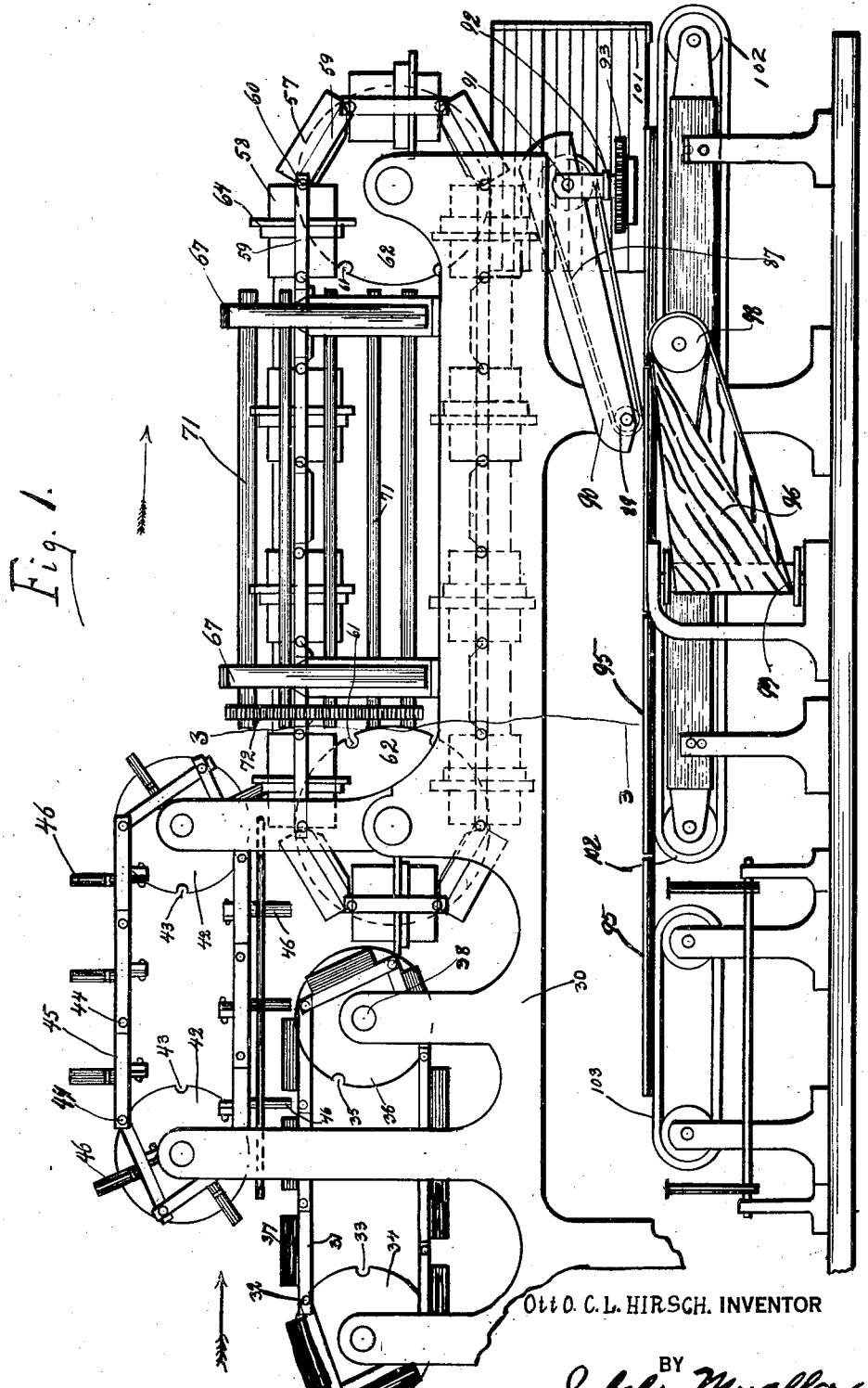
Fig. 1 is a side elevation, partly broken away, of my improved sausage linking and hanging machine.

Referring in detail to the drawings, the improved sausage linking and hanging machine comprises the framework 30 upon which is supported the means for conveying the filled casing to the meat separating and linking mechanism, this means comprising an endless carrier made up of similar sections 31 linked together and having projections 32 at the joints thereof engaging with the recesses 33 in the sprocket 34 suitably journaled in the framework 30 and the recesses 35 in the sprocket 36 also journaled in the framework 30.

The sections form a linked conveyor that follows an oblong path and each of the sections is provided with a U-shaped casing supporting member 37 which is preferably made of sheet metal and is formed as shown in Fig. 2. One of the shafts 38 carrying one of the sprockets 36, has keyed thereto the gear 39 which meshes with the gear 40 on the shaft 41. Keyed on the shaft 41 is one of the sprockets 42 provided with the peripheral recesses 43 with which the projections 44 on the link members 45 of the link carrier for the meat separating members cooperate to drive the linked member, the above mentioned gearing being driven by suitable means which is not shown.

The means for separating the meat in the casing into sections comprises pairs of fingers 46, there being one pair mounted on each section of the linked carrier embodying the links 45, the fingers 46 being pivoted to cross member 47 of the sections as at 48 and are normally held in separated position by means of the spring 49 mounted on the rod 50 which rod is pivoted to one of the fingers 46 and is slidable through an opening in the other thereof. The fingers 46 are each provided with suitable flexible engaging portions at the ends thereof which are preferably in the form of rubber tubes 51.

It will be seen on reference to Fig. 1 and Fig. 2 that, due to the gearing connecting the two link conveyors comprising the links 31 and the links 45, that the links 45 will always assume the same relative position to the links 31 as they move adjacent each other, the fingers 46 assuming a position between adjacent U-shaped members 37 as will be clear from Fig. 1.

When the fingers 46 are in position between a pair of the U-shaped elements 37, one finger will be on each side of the casing which has been previously filled with meat and these fingers are adapted to move toward each other so as to compress the portion of the casing located between them so as to separate the meat contained in the casing into sections. The fingers 46 are gradually brought toward each other by suitable guide members 52 which are provided with the curved end portions 53 and which gradually approach each other and finally assume a parallel position at 54 so that as the outer sides of the fingers 46 engage therewith and slide along the same, they will gradually approach each other so that the casing 55, referring now to Fig. 21 in which the casing is traveling in the direction indicated by the arrow, is gradually compressed therebetween at the points indicated by the numeral 56 until the meat in the casing is separated into sections and the casing is firmly gripped by the rubbers or any other suitable flexible members 51 so that the casing will be supported by the fingers 46 after reaching the point where the conveyor comprising the sections 31, turns downwardly and is carried by the conveyor comprising the links 45, to the twisting mechanism, the guides 52 extending to a point above the carriers of the endless conveyor embodied in the twisting mechanism and when the fingers 46 reach the ends of the guides 52, the springs 50 will immediately throw the fingers 46 apart as shown at the left of Fig. 21 and release the gripping members 51 from the casing 55. The casing 55 will then drop into position in the carriers of the twisting mechanism.

The twisting mechanism conveyor comprises alternating carriers 57 and 58, the carriers 57 serving merely to support or hold alternate casing sections and the carriers 58 being provided with suitable twisting mechanism which is to be described. The carriers 57 and 58 are each provided with link side members 59 and side plates 129 and are pivotally connected by means of pins 60 which are adapted to engage with the recesses 61 in the sprockets 62 which are suitably journaled in the framework 30 and are driven by suitable gearing which is not shown. The carriers 57 are provided with pockets which support the casing sections 55, said carriers having end members 130 having V-shaped grooves 131, terminating in semi-circular recesses 132 and the carriers 58 are provided with twisting members 63 which are journaled therein to rotate about an axis extending parallel to the direction of travel of the sections. Each of the members 63 is provided with suitable projections or teeth 64 on the exterior thereof and with a U-shaped recess 65 on the interior thereof within which the casing 55 is adapted to rest. Each twisting member is also provided with end plates 133 having V-shaped grooves 134, terminating in semi-circular recesses 135, and connected together by the longitudinal braces 136.

It will be seen from Fig. 23 that as the twisting mechanism turns relatively to the carriers that the end plates 130 and 133 will assume various relative positions and that the V-shaped grooves will tend to support the narrowed twisted portions 56 of the sausages in such a way as to prevent untwisting of the same, the semi-circular recesses being provided to prevent cutting of the casing at these points as the end plates 133 rotate relatively to end plates 130.

In order to prevent the casing 55 from falling out of the recess 65 when the same is rotated, a pivoted holding finger 66 is provided thereon. The finger 66 is adapted to assume either the dotted position shown in Fig. 13 or the full line position shown therein. The twisting members 63 are rotated by a suitable rotating means which is mounted in the frames 67 supported on the framework 30 which are shown in Figs. 12 and 22 and comprise two similar sections secured together by bolts 68. On the inner side of the frames 67 are mounted the rollers 69 on which are adapted to roll the rings 70 which are provided with internal teeth 71 which are in the form of long parallel bars as will be clear from Fig. 1. The teeth 71 are adapted to engage with the teeth 64 to rotate the twisting means. Mounted on one end of the bars 71 is the gear 72 which meshes with the gear 73 which is driven by the train of gearing comprising the beveled gears 74, 75 and 76, the gear 76 being mounted on the shaft 77 which is driven in any suitable manner from the driving mechanism of the machine.

After the carriers have passed through the cage-like member comprising the bars 71, the frames 67 and rings 70 and after passing over the sprocket 62, the holding fingers 66 are released to permit the sausages which have now been twisted into the proper linked form by the twisting mechanism just described, to be deposited upon the hanging mechanism. The means for opening and closing the holding fingers is shown in Figs. 13, 14 and 15. In Fig. 14, the parts are shown in open position just as they are being moved to closed position. The finger 66 has pivoted to the end thereof beyond the pivot point 78, the rod 79 which is adapted to engage at the lower end thereof with the inclined guide 80 when in the dotted position shown at Fig. 13.

Secured to the end of the pivot pin 81 connecting the members 66 and 79 is a coil spring 82 and secured to the lower face of the member 66 and inner face of the member 79 is the leaf spring 83. The member 63 is provided with a projection 84 that is adapted to engage with a notch 85 to hold the parts in the position shown in full lines in Fig. 13, the spring 83 pressing against the member 79 so as to hold the pin in engagement with the notch. Normally the holding means is in the dotted line position shown in Fig. 13 and the member 79 is adapted to engage with the inclined guide 80 and as the end of the pin 79 travels upwardly along the guide 80, the parts are moved to the full line position against the tension of the spring 82, and the spring 83 will press the member 79 into engagement with the pin 84 so that the same will engage with the notch 85 and hold the parts in the position shown in full lines in Fig. 13. The means for releasing the holding pins comprise the stationary cam 86 which is adapted to engage the end portion of the member 79 to move the same to the left as shown in Fig. 15. The movement of the member 79 to the left will disengage the pin 84 from the notch 85 and the spring 82 will hold the member 79 downwardly and move the member 66 to the dotted position shown in Fig. 13, the parts being shown in this position at the right of Fig. 15. After the holding means has been opened so as to release the casing which takes place when the carriers are directly above the hanging mechanism, the twisted casing forming the linked sausages is deposited on the belt conveyor 87 which passes over the pulleys 88 and 89, the pulley 89 being journaled in the housing 90 which is mounted on the upright 91, which is mounted to oscillate about a vertical axis coincident with that of a shaft 166.

The conveyor 87 and the housing 90 carried thereby is oscillated or swung about the axis of the shaft 166 by the following mechanism. The gear 75 is keyed to the shaft 150, which shaft is provided with a crank arm 151 at one end thereof which has a lug 152 secured to the extremity thereof, the lug operating in a slot 153 in the lever 154 which is keyed to the shaft 155 mounted in suitable bearings in the upright 156 of the framework and which has keyed to the other end thereof the arm or lever 157, which is provided with a slot 158 through which the shaft 159 projects. The shaft 159 is provided with a bevel gear 160 which meshes with a bevel gear 161 mounted on the shaft 92, which shaft has keyed thereto the gear 93. The gear 93 is driven from the shaft 77 through the gears 162 and 163.

The shaft 92 is mounted in bearings in the arms 164 and 165, said arms being mounted to turn on the vertically extending shaft 166. It will be noted that as the shaft 150 rotates the crank 151 operating in the slot 153 will cause the lever 154 to swing back and forth thus causing an oscillation of the shaft 155 and a swinging of the lower end of the arm 157 in a direction opposite to that of the swinging of the arm 154. This will cause the end of the shaft 159 that passes through the arm or lever 157 to be swung in an arcuate path about an axis that is coincident with the axis of the shaft 166 and swing the extreme end of the housing 90 and the end 89 of the conveyor 87 in an arcuate path so as to cause the same to move back and forth across the conveyor 96 and thus distribute the sausages on the smoking sticks in such a manner as to loop them back and forth on the same. The linked sausages extend substantial distances on each side of the sausage carrying stick 95, the linked sausages as shown in Fig. 10 extending to each side of the sticks 95 so as to reach substantially across the conveyors or guides 96 and 97 on each side of the sticks.

It will be seen on referring to Fig. 1 that the belt 96 is twisted so as to pass over a horizontal pulley 98 at the end thereof where the sausages are deposited thereon, and the vertically extending pulley or roller 99 at the opposite end thereof. As the linked sausages 100 rest thereon and on the sticks 95 and travel toward the right in Fig. 10 or toward the left in Fig. 1, due to the action of the conveyor supporting the sticks 95, the linked sausages will gradually move from a horizontal position to a hanging position on the sticks 95 and each stick will support the sausages in adjacent rows beside each other along the length of the stick and with strands thereof looped thereon on each side of said stick, it being understood that the conveyor or guide 97 is constructed in the same way as the guide 96 except that it turns in the opposite direction. The sticks 95 are fed from the container 101 onto the belt 102, referring now to Fig. 1, and this belt 102 carries the sticks 95 with the sausages supported thereon toward the left and onto the belt conveyor 103 which is located to the left of the conveyor 102. From the conveyor 103 the sticks 95 are removed and the sausages are stored on the same either in the smoke house or any other desirable place.

The feeding mechanism for the smoking sticks 95 comprises the star wheels 104 having four points 105 and being circularly grooved at 106 between the points 105 to conform to the outer contour of the smoking sticks 95, which star wheels are mounted on the shafts 107 and 108 and are adapted to turn therewith. Keyed on the shaft 107 is the gear 109, and keyed on the shaft 108 is the gear 110 meshing with the gear 109. The shaft 108 also has mounted thereon adapted to turn relative thereto an arm 111 provided with the dog 112 pivoted thereto at 113 and having a tooth 114 that is adapted to engage with the teeth on the gear 110 provided with a spring 115 to retract the same. Secured to the lower end of the arm 111 is the arm 116 which is pivoted to the stick holding member 101 at 117 and which is provided with a beveled laterally projecting portion 118, which is adapted to engage with laterally projecting lugs 119 on the conveyor chain 120 which travels from the left to the right on the upper side thereof in Fig. 17, and which is traveling from left to right in Fig. 20, and when one of the projections 119 engage with the enlargement 118 the rod or arm 116 pivots about the pivot 117 and the left hand extremity thereof moves to the left in Fig. 19 so that the tooth 114 engages with the teeth on the gear 110 to turn the gears 109 and 110 in opposite directions and thereby turn the star wheels 104 in opposite directions. The star wheels turn in the direction of the arrows in Fig. 18 to release one of the smoking sticks 95 and force the same downwardly onto the conveyor 120, by means of which the smoking stick is delivered into position to receive the sausages thereon.

In Fig. 5 the chain conveyor is shown as cooperating with a conveyor comprising the rollers 121 arranged in pairs between which the sticks 95 are adapted to travel and the conveyor 120 is shown as being provided with holes 122 for the sticks arranged at spaced points along the same.

In Fig. 9 the projections 119 are shown as being on the belt conveyor 102, it being immaterial what kind of a conveyor is used with the stick feeding mechanism shown. In order to prevent the weight of the sticks in the container 101 from turning the star wheels 106 to discharge a stick therefrom a brake 123 operated by a weight 124 is provided on the pulley 125 on the end of the shaft 107. Suitable guides are provided at the sides of the stick holder 101 for the sticks 95, the guides being designated in Fig. 17 by the numeral 145.

As shown in Figs. 5 and 8 the conveyor chain is provided with guide members 142 operating between the fixed guides 140 and 141.

Having thus described my invention what I claim as new and desire to secure by U. S. Letters Patent is:

1. A sausage linking and hanging machine comprising in combination, a linking mechanism and a feeding mechanism adapted to feed a casing to the linking mechanism, each of said mechanisms comprising a plurality of corresponding sections, the sections of the feeding mechanism being longer than the sections of the linking mechanism whereby a casing is deposited in the linking mechanism in a slack condition.

2. A sausage linking and hanging machine comprising in combination, a linking mechanism and a feeding mechanism adapted to separate the meat in a casing into sections and feed a casing to the linking mechanism, each of said mechanisms comprising a plurality of corresponding sections, the sections of the feeding mechanism being longer than the sections of the linking mechanism whereby a casing is deposited in the linking mechanism in a slack condition.

3. A sausage linking mechanism comprising a sectional feeding mechanism and a twisting mechanism comprising a sectional carrier, the sections of said feeding mechanism being longer than those of the carrier.

4. A sausage linking and hanging machine comprising a twisting mechanism and a hanging mechanism, said twisting mechanism being adapted to deposit the linked sausages on said hanging mechanism and said hanging mechanism comprising an endless conveyor mounted to swing about a pivot at one end thereof.

5. In a sausage linking machine, an endless traveling support and means cooperating therewith to gradually separate the meat in a casing fed over said support into spaced sections of equal lengths, said means comprising pairs of members adapted to gradually approach each other to compress the casing between them at spaced points.

6. In a sausage linking machine, an endless traveling support and means cooperating therewith to gradually separate the meat in a casing fed over said support into spaced sections of equal lengths, said means comprising pairs of members adapted to gradually approach each other to compress the casing between them at spaced points and guide means engaging said members to move said members toward each other.

7. In a sausage linking machine, an endless traveling support comprising a plurality of linked sections, and means for separating the meat in a casing fed over said support into spaced sections of equal lengths, said means comprising pairs of members adapted to approach each other to engage said casing at spaced points.

8. In a sausage linking machine, an endless traveling support comprising a plurality of linked sections, and means for separating the meat in a casing fed over said support into spaced sections of equal lengths, said means comprising pairs of members adapted to approach each other to compress said casing between them at spaced points with a gradually increasing pressure.

9. In a sausage linking machine, an endless traveling support comprising a plurality of linked sections, and means for separating the meat in a casing fed over said support into spaced sections of equal lengths, said means comprising pairs of yieldable fingers adapted to approach each other to engage said casing at spaced points.

10. In a sausage linking machine, an endless traveling support comprising a plurality of linked sections, means for separating the meat in a casing fed over said support into spaced sections of equal lengths, said means comprising pairs of members adapted to approach each other to engage said casing at spaced points, and guide means engaging said members to move said members toward each other.

11. In a sausage linking machine, an endless traveling support comprising a plurality of linked sections, means for separating the meat in a casing fed over said support into spaced sections of equal lengths, said means comprising pairs of members adapted to approach each other to engage said casing at spaced points, and a pair of guide rails engaging said members, said guide rails gradually approaching each other.

12. In a sausage linking machine, an endless traveling support, and means for separating the meat in a casing fed over said support into spaced sections of equal lengths, said means comprising spaced pairs of members adapted to compress a casing between them at spaced points with a gradually increasing pressure, and a pair of guides engaging said members, said guides gradually approaching each other to move said pairs of members gradually toward each other.

13. A sausage linking machine comprising a twisting mechanism, a feeding mechanism associated therewith and means to impart a plurality of twisting movements to said twisting mechanism, said means comprising an internal spur gear engaging said twisting mechanism.

14. A sausage linking machine comprising a series of carriages, said series comprising alternating supporting and twisting carriages, and means to impart a plurality of twisting movements to said twisting carriages, said means comprising an internal spur gear engaging said twisting mechanism.

15. A sausage linking machine comprising a series of carriages to form an endless conveyor, said series comprising alternating supporting and twisting carriages and means to impart a plurality of twisting movements to said twisting carriages, said means comprising an internal spur gear engaging said twisting mechanism.

16. A sausage linking machine comprising a series of alternate dissimilar carriages connected end to end to form an endless conveyor for the sausages, certain of the alternate carriages having a rotatable twisting element adapted to twist a section of a sausage supported thereby, and means for rotating said twisting element comprising an internal spur gear.

17. A sausage linking machine comprising a series of alternate dissimilar carriages connected end to end to form an endless conveyor for the sausages, certain of the alternate carriages having a rotatable twisting element adapted to twist a section of a sausage supported thereby, and means for rotating said twisting element comprising an internal spur gear, said twisting elements being provided with means adapted to be engaged by said gear to rotate said elements.

18. A sausage linking machine comprising a twisting carriage having mounted therein a twisting element provided with means to receive a sausage, and means for turning said twisting element on said carriage, said twisting element being provided with means to loosely hold said sausage from falling out of said element.

19. A sausage linking machine comprising a twisting carriage having mounted therein a twisting element provided with a U-shaped opening to receive a sausage, and means for turning said twisting element on said carriage, said twisting element being provided with a closure for said opening to prevent said sausage from falling out of said element as said element is turned.

20. A sausage linking machine comprising a twisting carriage having mounted therein a twisting element provided with a U-shaped opening to receive a sausage, and means for turning said twisting element on said carriage, said twisting element being provided with a closure for said opening to loosely hold and to prevent said sausage from falling out of said element as said element is turned.

21. A sausage linking machine comprising a twisting carriage having mounted therein a twisting element provided with a U-shaped opening to receive a sausage, and means for turning said twisting element on said carriage, said twisting element being provided with a pivoted finger adapted to close the mouth of said opening, to loosely hold said sausage in said twisting element.

22. A sausage linking machine comprising a twisting carriage having mounted therein a twisting element provided with a U-shaped opening to receive a sausage, and means for turning said twisting element on said carriage, said twisting element being provided with a pivoted finger adapted to close the mouth of said opening, to loosely hold said sausage in said twisting element and means for moving said finger to closing position before said element is turned.

23. A sausage linking machine comprising a series of carriages connected end to end to form an endless conveyor for said carriages, certain of said carriages being provided with a rotatable twisting element adapted to twist a section of sausage supported thereby, and means for rotating said twisting elements, said elements passing through said means as they are rotated thereby.

24. A sausage linking machine comprising a series of carriages, said series comprising alternating supporting and twisting carriages having rotatable sausage holders, means to support sausages in said holders below the center of rotation thereof, and means for rotating said holders to twist said sausages.

25. A sausage linking machine comprising a series of carriages, said series comprising alternating supporting and twisting carriages having rotatable sausage holders, means to support sausages in said holders below the center of rotation thereof, and means for rotating said holders to twist said sausages, said means comprising an internal spur gear.

26. A sausage linking and hanging machine comprising a series of carriages supported on side chains and together forming an endless conveyor for said sausages, and sprockets over which chains pass, said sausages being supported in said carriages below said side chains in slack condition whereby said sausages will remain slack when said carriages pass around said sprockets.

27. A sausage linking and hanging machine comprising means for delivering a filled casing to said machine, means for separating the meat in said casing into sections, means for twisting said sections to link said sausages and means for hanging said sausages across a stick or rod, said sausages being carried through said machine in a slack condition.

28. In a machine of the character described, means for separating the meat in a filled sausage casing into sections comprising pairs of flexible members that are adapted to gradually approach each other to separate the meat in said casing.

29. In a machine of the character described, means for separating the meat in a filled sausage casing into sections comprising pairs of flexible members that are adapted to gradually approach each other to separate the meat in said casing, said members being adapted to firmly grip said casing to deliver the same to a linking mechanism.

30. A sausage linking and hanging machine comprising a twisting mechanism and a hanging mechanism adapted to receive linked sausages from said twisting mechanism, said hanging mechanism comprising an endless conveyor mounted to swing about a pivot at one end thereof, and a stick carrying conveyor mounted below said swinging conveyor whereby said sausages are adapted to be spread on said sticks from end to end thereof.

31. In a sausage linking mechanism, an endless sectional carrier adapted to receive a filled casing thereon, and means for separating the meat in said casing, said means comprising an endless sectional linked member located above said carrier having sections provided with fingers adapted to engage said casing to separate the meat therein, said fingers being adapted to grip said casing to support the same when said casing reaches the end of said carrier.

32. A sausage linking mechanism comprising an endless sectional carrier adapted to receive a filled casing thereon, means for separating the meat in said casing, and sausage twisting means, said meat separating means comprising paired fingers adapted to grip said casing while on said carrier to separate the meat therein and convey said casing to said twisting means.

33. A sausage linking mechanism comprising an endless linked carrier adapted to receive a filled casing thereon, a twisting mechanism comprising an endless linked conveyor, and an endless linked member positioned above said carriers provided with pairs of fingers adapted to engage said casing to separate the meat therein into sections and carry said casing from said carrier to said twisting mechanism.

34. A sausage linking mechanism comprising an endless linked carrier adapted to receive a filled casing thereon, a twisting mechanism comprising an endless linked conveyor, and an endless linked member positioned above said carriers provided with pairs of fingers adapted to engage said casing to separate the meat therein into sections and carry said casing from said carrier to said twisting mechanism, said carrier and said linked member traveling at the same speed.

35. A sausage linking mechanism comprising an endless linked member having similar sections each provided with a pair of gripping fingers adapted to separate the meat in a sausage casing into sections and support the same, and a twisting mechanism comprising an endless linked sectional carrier, each of the sections of which is adapted to receive a section of said casing thereon from said gripping fingers, the length of said sections being less than the distance between adjacent pairs of said fingers whereby said casing is delivered to said twisting mechanism in a slack condition.

36. A sausage linking mechanism comprising an endless linked member having similar sections each provided with a pair of gripping fingers adapted to separate the meat in a sausage casing into sections and support the same, a twisting mechanism comprising an endless linked sectional carrier, and means for releasing said fingers whereby each of the sections of said carrier is adapted to receive a section of said casing thereon from said gripping fingers, the length of said sections being less than the distance between adjacent pairs of said fingers whereby said casing is delivered to said twisting mechanism in a slack condition.

37. In a sausage linking machine, a twisting mechanism comprising an endless conveyor comprising alternating supporting and twisting carriers, said twisting carriers each having a rotatable twisting member provided with teeth on the exterior surface thereof and a rotating member through which said carriers are adapted to pass, said rotating member being provided with teeth on the interior thereof adapted to engage the teeth of said twisting member to rotate the same.

38. In a sausage linking machine a twisting mechanism comprising an endless conveyor comprising alternating supporting and twisting carriers, said twisting carriers each having a rotatable twisting element having means to support a sausage casing eccentrically therein.

39. In a sausage linking machine a twisting mechanism comprising an endless conveyor comprising alternating supporting and twisting carriers, said twisting carriers each having a rotatable twisting element having means to support a sausage casing eccentrically therein, and means for loosely holding said casing in said twisting element.

40. A sausage linking and hanging machine comprising a twisting mechanism having an endless conveyor comprising alternating supporting and twisting carriers, said twisting carriers having means for loosely holding a casing therein, a hanging mechanism and means for releasing said holding means to deposit the linked sausages on said hanging mechanism.

41. A sausage linking and hanging machine comprising a twisting mechanism having an endless conveyor comprising alternating supporting and twisting carriers, said twisting carriers having means for loosely holding a casing therein, a hanging mechanism and means for releasing said holding means to deposit the linked sausages on said hanging mechanism, said hanging mechanism comprising an endless conveyor mounted to swing about a pivot at one end thereof substantially in a horizontal plane.

42. A sausage linking and hanging machine comprising a twisting mechanism having an endless conveyor comprising alternating supporting and twisting carriers, said twisting carriers having means for loosely holding a casing therein, a hanging mechanism and means for releasing said holding means to deposit the linked sausages on said hanging mechanism, said hanging mechanism comprising an endless belt mounted to swing about a pivot at one end thereof substantially in a horizontal plane.

43. A sausage linking and hanging machine comprising a twisting mechanism having an endless conveyor comprising alternating supporting and twisting carriers, said twisting carriers having means for loosely holding a casing therein, a hanging mechanism and means for releasing said holding means to deposit the linked sausages on said hanging mechanism, said hanging mechanism comprising an endless conveyor mounted to swing about a pivot at one end thereof substantially in a horizontal plane and a stick carrying conveyor mounted below said swinging conveyor.

44. A sausage linking and hanging machine comprising a twisting mechanism having an endless conveyor comprising alternating supporting and twisting carriers, said twisting carriers having means for loosely holding a casing therein, a hanging mechanism and means for releasing said holding means to deposit the linked sausages on said hanging mechanism, said hanging mechanism comprising an endless conveyor mounted to swing about a pivot at one end thereof substantially in a horizontal plane and a stick carrying conveyor mounted below said swinging conveyor whereby said sausages are adapted to be spread on said sticks from end to end thereof.

45. A sausage linking and hanging machine comprising a twisting mechanism having an endless conveyor comprising alternating supporting and twisting carriers, said twisting carriers having means for loosely holding a casing therein, a hanging mechanism and means for releasing said holding means to deposit the linked sausages on said hanging mechanism, said hanging mechanism comprising an endless conveyor mounted to swing about a pivot at one end thereof substantially in a horizontal plane, a stick carrying conveyor mounted below said swinging conveyor, and means for feeding sticks to said conveyor at regularly spaced intervals.

46. A sausage linking and hanging machine comprising a twisting mechanism having an endless conveyor comprising alternating supporting and twisting carriers, said twisting carriers having means for loosely holding a casing therein, a hanging mechanism and means for releasing said holding means to deposit the linked sausages on said hanging mechanism, said hanging mechanism comprising an endless conveyor mounted to swing about a pivot at one end thereof substantially in a horizontal plane, a sausage receiving stick carrying conveyor mounted below said swinging conveyor whereby said sausages are adapted to be spread on said sticks from end to end thereof, and means for supporting said sausages at the sides of said sticks, said supporting means being inclined whereby said sausages gradually assume a hanging position on said sticks.

47. A sausage linking and hanging machine comprising a twisting mechanism having an endless conveyor comprising alternating supporting and twisting carriers, said twisting carriers having means for loosely holding a casing therein, a hanging mechanism and means for releasing said holding means to deposit the linked sausages on said hanging mechanism, said hanging mechanism comprising an endless conveyor mounted to swing about a pivot at one end thereof substantially in a horizontal plane, a sausage receiving stick carrying conveyor mounted below said swinging conveyor whereby said sausages are adapted to be spread on said sticks from end to end thereof, and traveling means for supporting said sausages at the sides of said sticks, said supporting means being inclined whereby said sausages gradually assume a hanging position on said sticks.

48. In a sausage linking and hanging machine a linking mechanism, a hanging mechanism adapted to receive the sausages from said linking mechanism and means for feeding sausage hanging sticks to said hanging mechanism comprising a stick container, an endless conveyor for said sticks and means for depositing said sticks on said conveyor one at a time.

49. In a sausage linking and hanging machine a linking mechanism, a hanging mechanism adapted to receive the sausages from said linking mechanism and means for feeding sausage hanging sticks to said hanging mechanism comprising a stick container, an endless conveyor for said sticks and means for depositing said sticks on said conveyor one at a time, said means comprising pairs of stick supporting rotatable members on the bottom of said stick container, and means for periodically actuating said members to release one of said sticks.

50. In a sausage linking and hanging machine a linking mechanism, a hanging mechanism adapted to receive the sausages from said linking mechanism and means for feeding sausage hanging sticks to said hanging mechanism, comprising a stick container, an endless conveyor for said sticks and means for depositing said sticks on said conveyor one at a time, said means comprising pairs of stick supporting rotatable members on the bottom of said stick container, and means for periodically actuating said members to release one of said sticks, said last mentioned means being held in inoperative position when a stick is in position on said conveyor beneath said container.

51. A sausage linking and hanging machine comprising a twisting mechanism and a hanging mechanism, said hanging mechanism being adapted to receive a linked sausage casing from said twisting mechanism, said hanging mechanism comprising a sausage receiving stick carrying conveyor, and means for supporting and guiding said sausages at each side of said conveyor said means being gradually inclined from a horizontal to a vertical position in the direction of travel of said conveyor.

52. A sausage linking and hanging machine comprising a twisting mechanism and a hanging mechanism, said hanging mechanism being adapted to receive a linked sausage casing from said twisting mechanism, said hanging mechanism comprising a sausage receiving stick carrying conveyor, and means for supporting and guiding said sausages at each side of said conveyor said means being gradually inclined from a horizontal to a vertical position in the direction of travel of said conveyor, said means traveling in the direction of travel of said conveyor.

53. A sausage linking machine comprising a series of carriages connected end to end to form an endless conveyor for said sausages, said carriages being provided with means for preventing said sausages from untwisting.

54. A sausage linking machine comprising a series of alternate dissimilar carriages connected end to end to form an endless conveyor for the sausages, certain of the alternate carriages having a rotatable twisting element adapted to twist a section of a sausage supported thereby, and means on said carriages for preventing said sausages from untwisting.

55. In a sausage linking machine, a twisting mechanism comprising an endless conveyor comprising alternating supporting and twisting carriers, said twisting carriers each having a rotatable twisting member provided with teeth on the exterior surface thereof and a rotating member through which said carriers are adapted to pass, said rotating member being provided with elongated barlike members serving as teeth on the interior thereof adapted to engage the teeth of said twisting member to rotate the same.

56. A sausage linking and hanging machine comprising a twisting mechanism having an endless conveyor comprising alternating supporting and twisting carriers, said twisting carriers having means for loosely holding a casing therein, said holding means comprising a holding finger pivoted on said twisting carrier, said holding finger being pivoted on said carrier near one end thereof, an actuating rod connected to said finger beyond the pivot thereof, a holding lug with which said rod is adapted to cooperate to hold said finger in sausage holding position, and means urging said rod toward finger opening position, and means for disengaging said rod from said lug to move said holding finger to sausage releasing position.

57. A sausage linking and hanging machine comprising a twisting mechanism having an endless conveyor comprising alternating supporting and twisting carriers, said twisting carriers having means for loosely holding a casing therein, said holding means comprising a holding finger pivoted on said twisting carrier, said holding finger being pivoted on said carrier near one end thereof, an actuating rod connected to said finger beyond the pivot thereof, said rod being provided with a notch having an inclined wall, a holding lug adapted to enter said notch to hold said finger in sausage holding position, spring means for holding said rod in engagement with said lug and a spring urging said rod and finger toward sausage releasing position, and means for moving said rod away from said lug whereupon said spring moves said finger to sausage releasing position.

58. A sausage linking and hanging machine comprising a twisting mechanism having an endless conveyor comprising alternating supporting and twisting carriers, said twisting carriers having means for loosely holding a casing therein, a hanging mechanism and means for releasing said holding means to deposit the linked sausages on said hanging mechanism, said hanging mechanism comprising an endless conveyor mounted to swing about a pivot at one end thereof substantially in a horizontal plane, a sausage receiving stick carrying conveyor mounted below said swinging conveyor whereby said sausages are adapted to be spread on said sticks from end to end thereof, and a belt moving in the direction of travel of the stick carrying conveyor for supporting said sausages at the sides of said sticks, said belt being inclined whereby said sausages gradually assume a hanging position on said sticks.

59. In a sausage linking and hanging machine a linking mechanism, a hanging mechanism adapted to receive the sausages from said linking mechanism and means for feeding sausage hanging sticks to said hanging mechanism, comprising a stick container, an endless conveyor for said sticks and means for depositing said sticks on said conveyor one at a time, said means comprising pairs of stick supporting rotatable members on the bottom of said stick container, and means for periodically actuating said members to release one of said sticks, said means comprising a ratchet wheel, a pawl adapted to engage said ratchet wheel, a lever connected with said pawl, and means on said stick conveyor adapted to periodically engage said lever to actuate said pawl thereby to rotate said stick supporting members and release a smoking stick.

60. A sausage linking machine comprising a series of alternate dissimilar carriages connected end to end to form an endless conveyor for the sausages, certain of the alternate carriages having a rotatable twisting element adapted to twist a section of a sausage supported thereby, and end walls on said carriages having tapering openings to hold said sausages from untwisting.

61. A sausage linking machine comprising a series of carriages to form an endless conveyor, said series comprising alternating supporting and twisting carriages and means to impart a plurality of twisting movements to said twisting carriages, said means comprising a pair of ring members, and bars connecting said ring members and engaging said twisting mechanism.

62. A sausage linking machine comprising a series of carriages to form an endless conveyor, said series comprising alternating supporting and twisting carriages and means to impart a plurality of twisting movements to said twisting carriages, said means comprising a pair of ring members, bars connecting said ring members and engaging said twisting mechanism, a framework in which said ring members are adapted to rotate and rollers mounted on said frame work engaging said ring members.

In witness whereof, I hereunto subscribe my name this 2nd day of December A. D., 1920.

OTTO C. L. HIRSCH.